United States Patent [19]

Sharp

[11] 3,890,508

[45] June 17, 1975

[54] WORKPIECE ALIGNMENT SYSTEM

[75] Inventor: Mark Edward Sharp, Oklahoma City, Okla.

[73] Assignee: Texas Instruments Incorporated, Dallas, Tex.

[22] Filed: Dec. 28, 1973

[21] Appl. No.: 429,334

[52] U.S. Cl. .......................... 250/548; 226/45; 302/2

[51] Int. Cl. .......................... G01n 21/30

[58] Field of Search .............. 355/97, 99, 100, 103; 302/2; 226/33, 45; 250/548

[56] References Cited

UNITED STATES PATENTS

| | | | |
|---|---|---|---|
| 3,013,459 | 12/1961 | Coleman | 226/45 |
| 3,025,740 | 3/1962 | Sorkin | 250/548 |
| 3,322,961 | 5/1967 | Harrison | 250/548 |
| 3,452,853 | 7/1969 | Mabon | 226/45 |
| 3,683,195 | 8/1972 | Johannsmeier | 250/548 |
| 3,713,571 | 1/1973 | Simonton | 226/45 |
| 3,797,889 | 3/1974 | Wilkinson | 302/2 |

*Primary Examiner*—James W. Lawrence
*Assistant Examiner*—D. C. Nelms
*Attorney, Agent, or Firm*—Harold Levine; James T. Comfort; James O. Dixon

[57] ABSTRACT

A workpiece alignment system is particularly useful in the alignment of circular or cylindrical workpieces. The workpieces are provided with a flat edge along the circumference which flat edge is aligned in a preselected direction, thereby aligning the workpiece. The system is comprised of a body which includes apertures through which directional air jets flow, carrying the workpiece on a directional air cushion to position the workpiece on the body, rotational air jet apertures for rotating the positioned workpiece until the flat edge is in the preselected direction, and flat sensing vacuum apertures for stopping the rotation of the workpiece when the flat edge is in the preselected direction and for providing a signal indicative of the alignment of the workpiece for the system. In order to speed up the slice alignment and prevent slice overshoot, a pair of photocells is provided in the body, at least one of which is covered by the slice until just prior to proper slice alignment. At this time, both of the photocells are uncovered, thereby operating a circuit to slow down rotation of the slice to obtain proper slice alignment without overshoot while retaining the ability to rotate the slice rapidly during the alignment procedure.

3 Claims, 12 Drawing Figures

WORKPIECE ALIGNMENT SYSTEM

This invention relates to workpiece alignment systems, and more particularly to systems for aligning circular workpieces in a preselected direction, capable of rapid workpiece rotation until just prior to alignment with subsequent slow workpiece rotation to prevent overshoot.

The system of the invention is particularly useful, for example, in the alignment of semiconductor slices for photolithographic processing. In order to photolithographically process a semiconductor slice, a phtoresist material is applied to the semiconductor slice and then selectively exposed to light utilizing a mask. The unexposed portions of the photoresist material are then removed to re-expose portions of the semiconductor material and the re-exposed semiconductor material is then processed such as by etching, doping, oxidation, etc. In the course of manufacturing semiconductor circuits and devices many of such photolithographic processes are required and in most cases it is desirable or necessary for the circular or cylindrical semiconductor slice to be aligned in the same direction for each selected exposure to ensure best alignment and to form regions which are in a desired relationship to each other such as a plurality of concentric regions. In accordance with the system described in the copending application of Thomas Frank Wilkinson, Ser. No. 214,123, now U.S. Pat. No. 3,797,889, filed Dec. 30, 1971 for Workpiece Alignment System, such semiconductor slices, provided with a flat edge, are always automatically aligned in the same direction or a known selected direction during the manufacturing process. However, on rotating the semiconductor slices to obtain the desired alignment, it was necessary to utilize a relatively slow rate of rotation of the slices to prevent overshoot. This slow rotation rate is time consuming and, furthermore, it is clear that a more rapid rotation rate for the slice which will result in proper alignment without overshoot will substantially increase the efficiency of the alignment system. This is accomplished utilizing the system of the present invention by rotating the slice rapidly, sensing when the slice is almost aligned and then slowing down the slice rotation rate to provide alignment without overshoot.

It is therefore an object of the present invention to provide an improved system for the alignment of circular or cylindrical workpieces.

It is another object of the invention to provide a system for the alignment of circular or cylindrical workpieces whereby the workpieces may be automatically aligned in the same direction at each of a plurality of work stations.

It is a further object of the invention to provide a system for the alignment of circular semiconductor slices for photolighogrphic processing whereby the semiconductor slice is aligned for selective exposure.

It is a still further object of this invention to provide a system for the alignment of circular semiconductor slices having a flat capable of relatively rapid rotational alignment speed without overshoot.

These and other objects and advantages of the invention are achieved by providing a system comprising a body. The body includes directional air apertures for rotation the workpieces once they have been positioned on the body; and flat sensing vacuum apertures for stopping the rotation of the workpieces once they have been aligned in a preselected direction and providing a signal indicative thereof for the system. The workpieces which are circular or cylindrical are provided with a flat member adjacent to the flat sensing vacuum apertures. The flat sensing vacuum apertures are positioned in the body such that the workpieces cover the vacuum apertures and the rotation of the workpiece is stopped by a reduced pressure suction generated in such vacuum apertures only when the flat edge of the rotating workpieces is positioned against the flat member adjacent to the flat sensing vacuum apertures. In order to provide rapid rotation of the workpiece without overshooting the flat vacuum sensing apertures, a pair of photocells is positioned on the body in such a location that one or both of the photocells is covered by the workpiece during workpiece rotation until the workpiece has been rotated to a position just prior to the alignment desired over the vacuum sensing apertures. At this point, due to the incipient location of the flat against the wall adjacent the vacuum sensing apertures and due to the force driving the workpiece against the wall, the workpiece will move toward the wall and expose both photocells simultaneously. This condition provides a signal to the workpiece rotating means to slow down rotation to prevent overshoot. This can be accomplished by reducing the force of the rotating air blast or, in the case of an air pulse rotating system, to decrease the pulse rate. The system may also include a movable gate member which is utilized in the initial positioning of the workpiece on the body and for releasing the workpiece after desired operations in the aligned position have taken place to the workpiece.

In one embodiment, the body comprises a movable chuck member which cooperates with an air jet conveyor system such as an air track. The movable chuck member includes a plurality of vacuum transfer apertures in which a reduced pressure suction is generated to clamp the workpiece to the chuck member in the aligned position while the chuck member carrying the workpiece is being moved. The chuck member may be moved to a position in the air track to receive a workpiece and then be moved with the aligned workpiece to a work station such as an exposure station where, for example, a semiconductor slice is selectively exposed utilizing a mask. When the chuck member is positioned in the air jet conveyor system, the workpieces are carried to the chuck member by air jets along the air track, onto the chuck member by the directional air jets of the chuck member, out of the chuck member by the directional air jets of the chuck member when the movable gate member is opened and further along the air track by the air jets along the air track. Furthermore, a plurality of such chuck members may be provided on a pivotably mounted arm such that one chuck member is positioned in the air track to receive or release a workpiece while the other chuck member is positioned at the work station where a desired operation is performed to the aligned workpiece.

Alternately, the body itself may comprise an alignment portion of an air jet conveyor system such as the air track whereby the workpieces are carried to the alignment portion by air jets along the air track, onto the alignment portion by the directional air jets, out of the alignment portion by the directional air jets when the movable gate member is opened and further along the air track by the air jets along the air track. In such an embodiment desired operations may be performed to the workpiece while it is in the aligned position on the alignment portion of the air track.

Furthermore, a plurality of such alignment portions or chuck members may be provided in a system, such as the automated semiconductor processing system described in U.S. Pat. No. 3,765,763, assigned to the assignee of the present invention, and hereby incorporated by reference. The workpieces may then be aligned in the same preselected direction at each of a number of work stations wherein, for example, photolithographic exposures take place and the work stations may be linked by one or more air tracks.

Still further objects and advantages of the invention will be apparent from the detailed discussion and claims when read in conjunction with the drawings wherein:

In accordance with the present invention, an alignment system includes a body having a plurality of directional air jet apertures for carrying workpieces on a directional air cushion to position the workpieces on the body; rotational air jet apertures for rotating the workpiece once it has been positioned on the body; a pair of photocells to determine when the workpiece is almost aligned to decrease the rotational speed of the workpiece; and vacuum apertures for stopping the rotation of the workpiece once it has been aligned in a preselected direction. In accordance with one embodiment of the invention and as illustrated in FIGS. 1–5, the body comprises a movable chuck member 10 which is utilized in a semiconductor manufacturing system wherein a circular semiconductor slice, provided with a flat edge along the circumference, is aligned on the chuck member 10, clamped to the chuck member 10, and moved to an expose machine where a photoresist material covering the semiconductor slice is selectively exposed through a mask while the slice is in the aligned position on the chuck member 10. The chuck member 10 includes the plurality of directional air apertures 11, the plurality of rotational air jet apertures 12, and the vacuum apertures 13.

Figure 1:
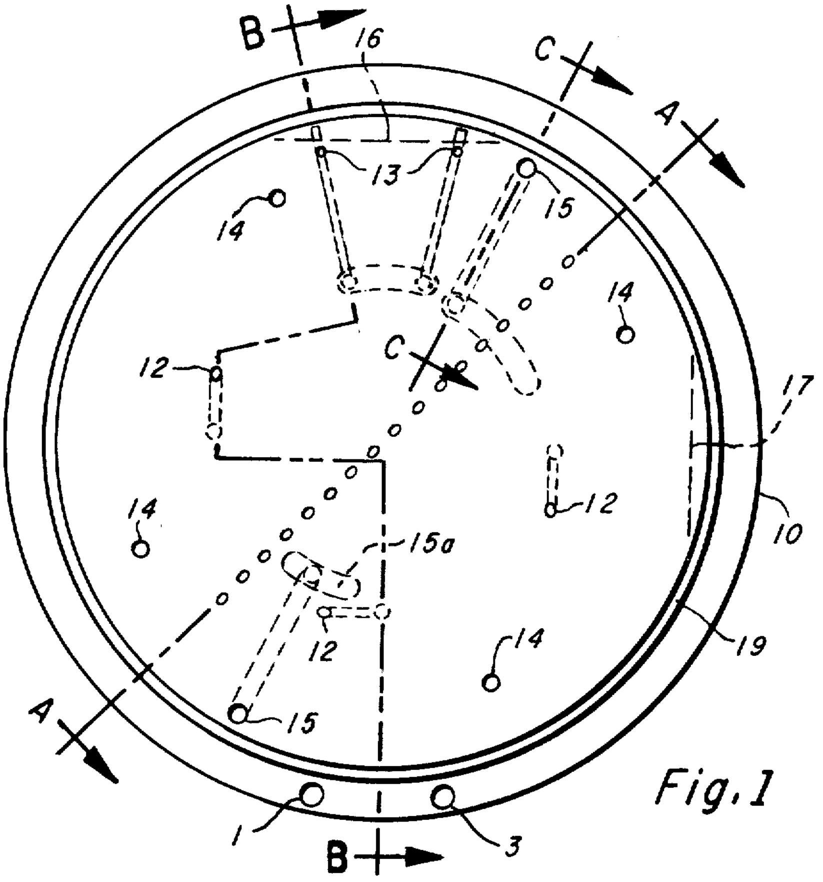
FIG. 1 is a top view of a chuck member comprising an embodiment of the system according to the present invention.
Figure 7:
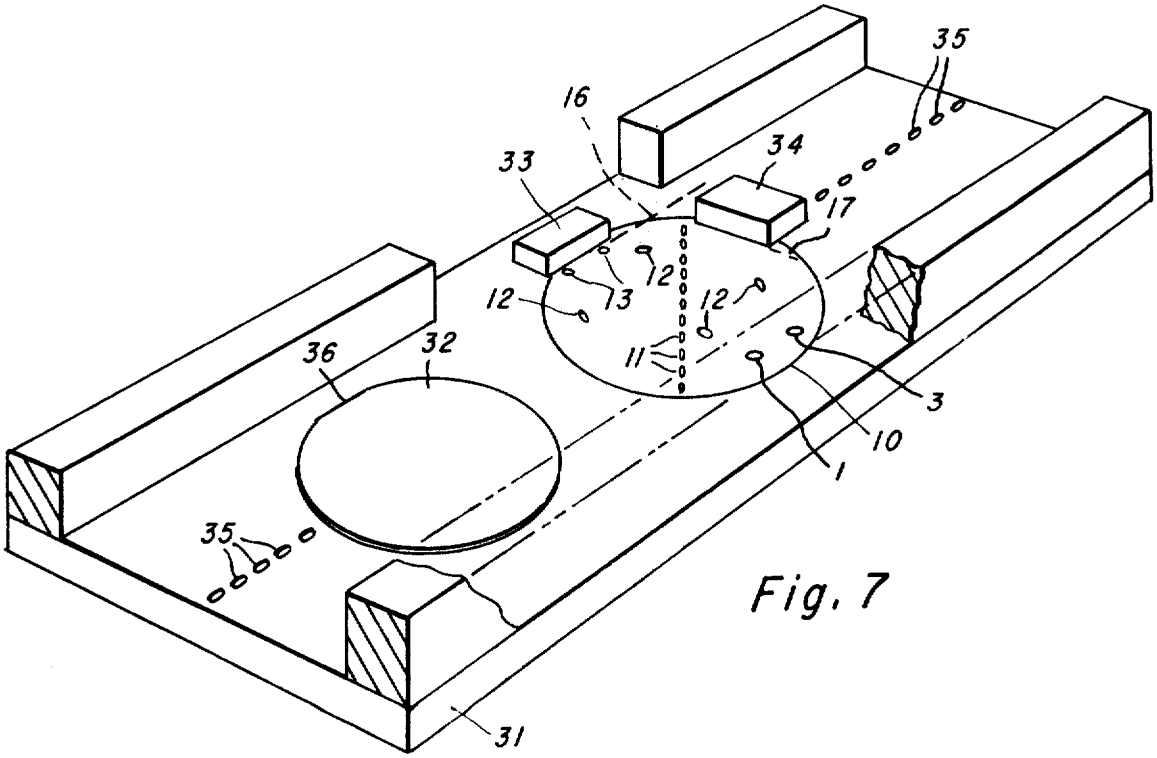

Referring to FIGS. 1 and 7, a first flat member 33 is provided along the dotted line 16 and a second member 34 is provided along the dotted line 17. The members 33 and 34 which are illustrated in the embodiment of FIG. 7 are fixed to, for example, an air track 31 which carries the workpiece which in the present embodiment is a semiconductor slice 32 into and out of the chuck member 10. The semiconductor slice is carried on a directional air cushion toward the dotted lines 16 and 17 by compressed air flowing through the directional air jet apertures 11 which are angled at about 30° from the surface of the chuck member in the direction of the dotted lines 16 and 17. The semiconductor slices are positioned on the chuck member when the slices are carried into contact with both the first flat member 33 along the dotted line 16 and the second member 34 along the dotted line 17. Once the slice is in contact with both of these members it can move no further in the direction of the directional air cushion. Then, the semiconductor slice is rotated on an air cushion provided by compressed air flowing through rotational air jet apertures 12. The air jet apertures 12 are also angled at about 30° from the surface of the chuck member in the desired direction of rotation. A reduced pressure suction is generated in the vacuum apertures 13 while the slice is rotating. The slices are aligned when the flat edge 36 of the slices 32 are rotated into contact with the first flat member 33 along the dotted line 16. Because of the members 33 and 34 along the dotted lines 16 and 17 respectively, the circular slice does not cover the vacuum apertures 13 unless the flat edge 36 of the semiconductor slice 32 is in contact with the flat member 33 and the flat edge 36 is aligned in the direction of the dotted line 16.

Figure 2:
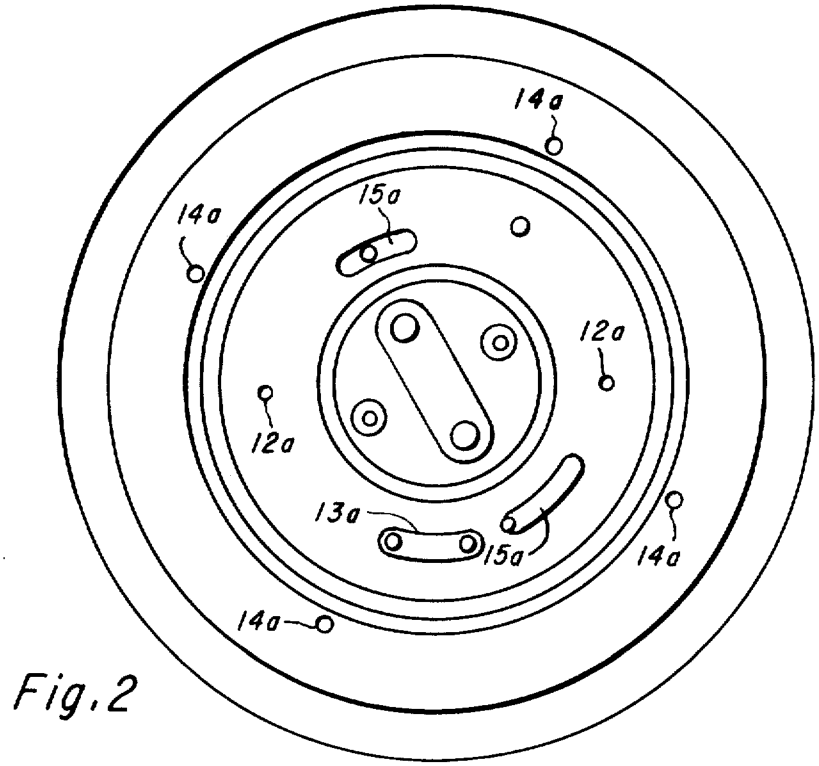
FIG. 2 is a bottom view of the chuck member of FIG. 1.

Referring to FIG. 2, a bottom view of the chuck member 10 is shown. The compressed air is applied to directional air jet apertures 11 through the opening 11*a*, to the rotational air jet apertures 12 through the openings 12*a*, and the reduced pressure suction generated in vacuum apertures 13 is provided at opening 13*a*. Additionally, where the chuck member is a movable member, vacuum transfer apertures 14 are provided in which a reduced pressure suction is generated to clamp the workpiece to the chuck member 10 in the aligned position while the chuck member 10 carrying the semiconductor slice 32 is being moved. The reduced pressure suction, generated in apertures 14, is provided through openings 14*a* on the bottom side of the chuck member 10. Furthermore, where the chuck member 10 is to carry the aligned semiconductor slice into an exposure machine for the selective exposure of a photoresist material coated on the slice, additional vacuum apertures 15 are provided and a flexible ring (not shown) or plastic or rubber, for example, provided so that a mask (typically made of glass) may be held firmly against the slice when the air is pumped out of apertures 15. The air is pumped out of apertures 15 from the bottom side of the chuck member 10 through openings 15*a*.

Figure 3:
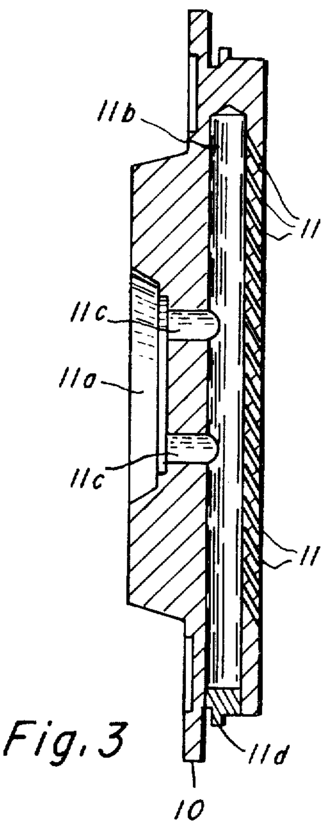
FIGS. 3–5 are various detailed sectional views of the chuck member of FIG. 1.

FIG. 3 is a sectional view taken through section A—A of FIG. 1. The apertures 11 are shown at about a 30° angle to the surface of the chuck member 10 to provide the directional air cushion. Apertures 11 are, for example, about 0.020 inches in diameter drilled into a chamber 11*b*. The chamber 11*b* is drilled into the side of the chuck member 10 and sealed with solder 11*d*, for example. Two additional apertures 11*c* are drilled from the bottom of the chuck member into the chamber 11*b*. Compressed air is pumped through the opening 11*a* through apertures 11*c* into chamber 11*b* and out of the various directional air jet apertures 11.

Figure 4:
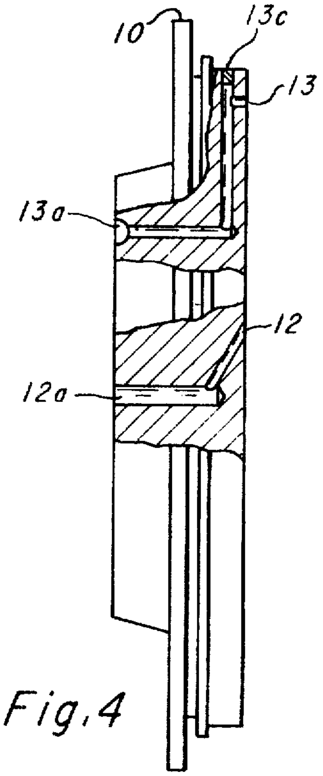

FIG. 4 is a sectional view taken through section B—B of FIG. 1 illustrating in particular one of the rotational air jet apertures 12 through which compressed air is pumped through opening 12*a* from the bottom of the chuck member. Also illustrated in FIG. 4 is a detailed view of the vacuum aperture 13 which is 0.032 inches in diameter, for example, drilled from the top of the chuck member 10 into a chamber 13*b*. Chamber 13*b* is drilled from the side of the chuck member 10 and is sealed by solder 13*c*, for example. Opening 13*a* is provided to the chamber 13*b* which is coupled to a vacuum pump to provide the necessary reduced pressure suction for aperture 13.

Figure 5:
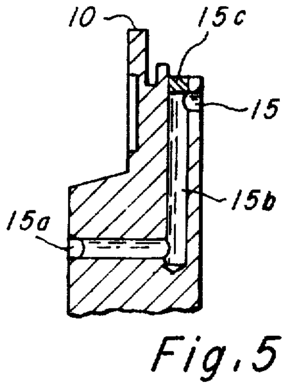

FIG. 5 is a sectional view through the section C—C of FIG. 1 showing in detail the aperture 15 which is utilized in the present embodiment to provide firm contact between a photoresist material coated on a semiconductor slice and a glass mask when a reduced pressure suction is provided at the opening 15*a* as previously discussed. The aperture 15 is 0.062 inches in diameter, for example, drilled from the top surface of the chuck member 10 into a chamber 15*b*. The chamber 15*b* is drilled in a similar manner to the chamber 13*b* and is sealed with solder 15*c*, for example.

Figure 9:
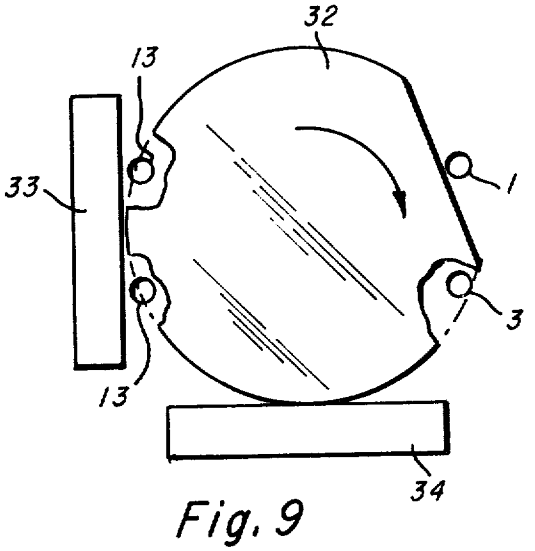
FIGS. 9–12 are schematic diagrams showing the operation of the photocell system of the present invention.
Figure 10:
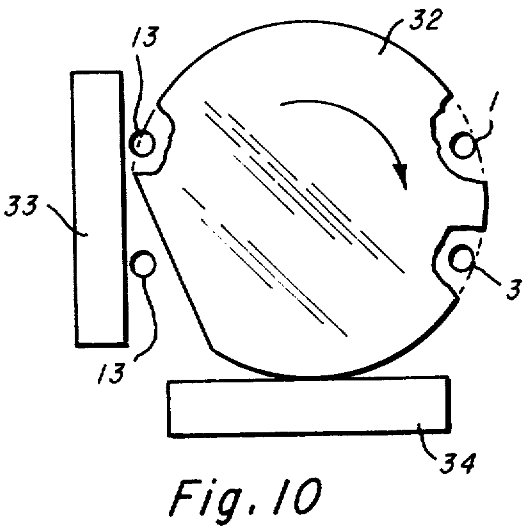
Figure 11:
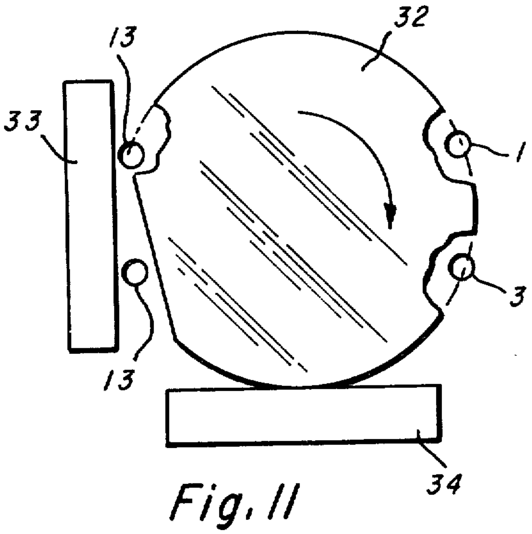
Figure 12:
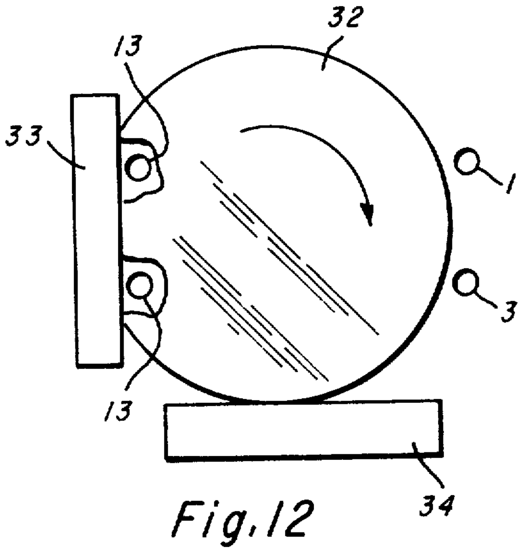

The rotational speed of the semiconductor slice 32 must be such that as it rotates due to air expelled from apertures 12, the rotation rate is sufficiently slow that the vacuum apertures 13 are not overshot. In accordance with the prior art as set forth above, this was accomplished by providing rotational air of sufficiently diminished pressure such that the slice would rotate slowly and be clamped by the vacuum apertures 13 when the flat passed thereover. This slow rotation of the slice 32 was relatively inefficient. Therefore, in order to speed up alignment of the slice without overshoot, a pair of photocells 1 and 3 is provided as shown in FIGS. 1 and 7. The slice 32 is rotated at a rapid rate relative to the prior art via air expelled from the apertures 12, after the slice is in contact with both the walls 33 and 34 as shown in FIG. 9. As the slice 32 commences rotation while misaligned as shown in FIGS. 9 and 10 at the rapid rotation rate, at least one of the photocells 1 and 3 is covered by the slice 32. However, as the slice 32 approaches proper alignment as shown FIG. 11, the slice 32 will move toward the wall 33 due to the partial positioning of the flat region 36 thereagainst and uncover both of the photocells 1 and 3 simultaneously. This performs an AND logical function in conjunction with external light impinging devices (not shown) which are focussed on the photocells 1 and 3 and thereby provide for a decrease in the rotational speed of the slice 32 as will be described in detail hereinbelow so that the slice will be locked in proper alignment over and cover the vacuum apertures 13 without overshoot as shown in FIG. 12.

Figure 6:
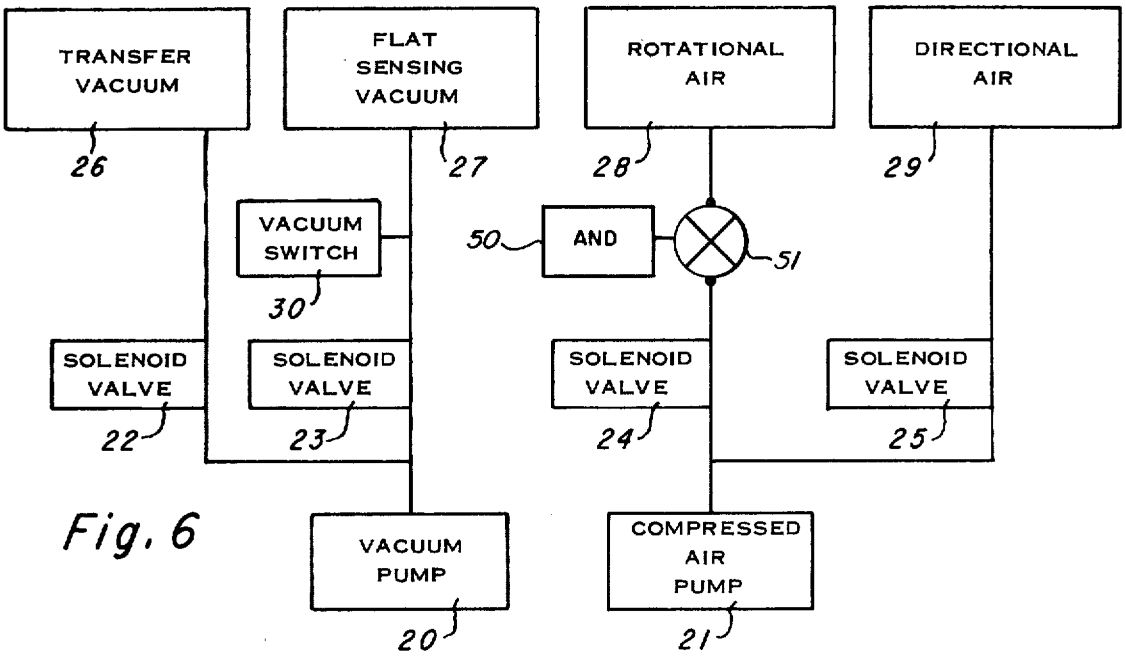
FIG. 6 is a block diagram of an embodiment of the system of the present invention.

Referring to FIG. 6, the system of the present invention includes a reduced pressure suction pump such as a vacuum pump 20 and a compressed air pump 21. The flat sensing vacuum 27 is provided for apertures 13 when solenoid valve 23 is opened. When the semiconductor slice is rotated into the aligned position, the slice completely covers vacuum apertures 13 causing the rotation of the slice to stop and causing the pressure of the flat sensing vacuum to build up in the vacuum line and throw vacuum switch 30 which provides a signal indicative of the alignment of the slice for the system. The transfer vacuum 16 for the transfer vacuum apertures 14 is also provided by vacuum pump 20 when the solenoid valve 22 is opened. The rotational air 28 and the directional air 29 for the rotational air jet apertures 12 and the directional air jet apertures 11, respectively, is provided by the compressed air pump 21 and controlled by the solenoid valves 24 and 25, respectively. The pressure of the rotational air 28 is relatively high in order to allow high speed rotation of the slice 32. However, when both of the photocells 1 and 3 are uncovered, the AND gate 50 is rendered operational and partially closes the valve 51 in the line for rotational air, thereby reducing the force applied to the slice 32 through apertures 12 and slowing down the rotational speed of the slice.

Referring to FIG. 7 in conjunction with FIG. 6, one method of operating the described system is as follows. Solenoid valve 25 is opened thereby providing directional air to the directional air apertures 11. A semiconductor slice 32 on an air track 31, for example, is carried to the apertures 11 by air jets 35, and then is carried by the directional air jets provided by apertures 11 onto the chuck member 10 until the semiconductor slice makes contact with both the first flat member 33 and the second flat member 34. Then the solenoid valve 24 is opened and valve 51 being wide open, high pressure rotational air 28 is provided through apertures 12 causing the semiconductor slice 32 to rotate in the direction of the air flow through apertures 12 which are angled with respect to the top surface of the chuck member 10. Additionally, solenoid valve 23 is opened providing a reduced pressure suction at the vacuum apertures 13. The semiconductor slice 32 rotates until both of the photocells 1 and 3 are uncovered whereupon the AND gate 50 is enabled and partially closes valve 51 to provide low pressure rotational air 28 and slow down the rotational speed of the slice 32. The semiconductor slice 32 continues to rotate at slow speed until the flat edge 36 is in contact with the flat member 33. At this time, the semiconductor slice covers the apertures 13 and the reduced pressure suction causes the rotation of the slice to stop. Additionally, because the semiconductor slice is covering apertures 13, pressure is further reduced in the vacuum line to the apertures 13 causing vaccum switch 30 to be activated. The vacuum switch 30 then provides a signal for the system indicating that the semiconductor slice has been aligned and the solenoid valves 24 and 25 are closed. A solenoid valve 22 is opened, providing a reduced pressure suction to apertures 14 to firmly clamp the aligned semiconductor slice to the chuck member 10 so that the chuck member 10 may be moved without disturbing the alignment of the semiconductor slice. The solenoid valve 23 may then be closed. In the embodiment of FIG. 7, the member 34 can be a movable gate member. When the desired operations have been performed to the aligned slice, the member 34 is raised and the solenoid valve 25 opened to release the slice from chuck member 10. The slice is then carried down the air track 31 by air jets 35.

Figure 8:
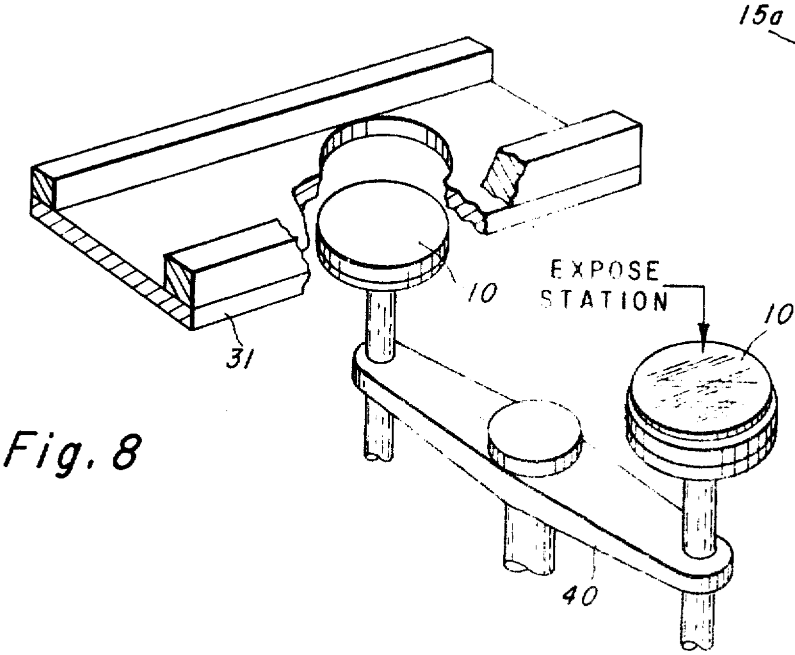
FIGS. 7 and 8 are isometric views of portions of automated semiconductor assembly lines utilizing various embodiments of the invention.

Referring to FIG. 8, one system embodying the present invention utilizes the air track 31 and two chuck members 10 mounted on a pivotable arm 40. The chuck members 10 may be raised or lowered with respect to the arm 40. The arm 40 is pivoted so that one of the chuck members 10 is below an opening in the air track 31 and then raised to the level of the air track so that the top surface of the chuck member is flush with the surface of the air track while the other of the chuck members 10 carrying an aligned semiconductor slice is positioned at a work station such as an expose station 39 where a photoresist material coating the semiconductor slice is selectively exposed to light through a mask with the semiconductor slice in the aligned position. The chuck member positioned in the air track may release an exposed slice and receive a new slice while the other chuck member is at the expose station. The chuck members 10 are then lowered and arm 40 pivoted so that the chuck members reverse positions; the chuck member from the air track carrying a new slice to the expose station 39 and the chuck member from the expose station carrying the exposed slice to the air track.

Various embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention, will, without departing from the spirit and scope of the invention, be apparent to persons skilled in the art.

What is claimed is:

1. A system for positioning and aligning a circular workpiece having an irregular circumference at one region along its circumference comprising in combination:

a. a pair of stop members, and b. a body, c. said stop members being so positioned relative to said body as to position a workpiece on said body when both of said stop members are in contact with the circumference of said workpiece and in a desired aligned position only when the irregular portion of the circumference of said workpiece is in contact with one of said members, d. said body having i. a surface on which a workpiece is received for positioning and aligning, ii. a plurality of fluid passages communicating with said surface and a source of pressurized fluid and being so arranged and positioned to produce an upwardly inclined and directional fluid jet flow to urge said workpiece into contact with both said stop members, iii. a second plurality of fluid passages communicating with said surface and a source of pressurized fluid and so arranged and positioned to produce an upwardly inclined and tangential fluid jet flow to rotate said workpiece while being so urged, and iv. a third plurality of fluid passages communicating with said surface and a source of partial vacuum and positioned to be within the circumference of the vertical projection of said workpiece on to said surface only when both said stop members are in contact with the circumference of said workpiece and said irregular portion of the circumference of said workpiece is in contact with one of said stop members, v. a plurality of photodetector means so arranged and positioned within the circumference of the vertical projection of said workpiece on to said surface that all of said plurality of photodetector means are illuminated with actuating radiation only when said workpiece is within a given rotational angle of being in said desired aligned position, whereby said workpiece is urged against both of said stop members and rotated toward said desired aligned position at a first rotational speed while less than all of said photodetector means are illuminated with activating radiation and at a second slower rotational speed when all of said plurality of photodetector means are illuminated with said activating radiation.

2. A system for positioning and aligning a circular workpiece as defined in claim 1 wherein the illumination of all of said plurality of photodetector means activates means decreasing the supply of pressurized fluid to said third plurality of fluid passages.

3. A system for positioning and aligning a circular workpiece as defined in claim 2 wherein said means for decreasing comprises an AND gate and a fluid valve responsive thereto.

* * * * *